United States Patent
Dent, III

(10) Patent No.: US 6,729,511 B2
(45) Date of Patent: May 4, 2004

(54) LIFTING HARNESS

(76) Inventor: Thomas E. Dent, III, 1830 County Rd. 114, Glenwood Springs, CO (US) 81601

(*) Notice: Subject to any disclaimer, the term of this patent is extended or adjusted under 35 U.S.C. 154(b) by 30 days.

(21) Appl. No.: 10/102,103

(22) Filed: Mar. 19, 2002

(65) Prior Publication Data

US 2002/0148866 A1 Oct. 17, 2002

Related U.S. Application Data

(60) Provisional application No. 60/283,974, filed on Apr. 17, 2001.

(51) Int. Cl.$^7$ ............................. A45F 3/04; A45F 5/00
(52) U.S. Cl. ..................... 224/259; 224/157; 224/268
(58) Field of Search ..................... 294/74, 152, 157; 182/3; 224/157, 258, 259, 268, 260, 262

(56) References Cited

U.S. PATENT DOCUMENTS

| | | | | |
|---|---|---|---|---|
| 1,490,066 A | * | 4/1924 | Carr | 182/3 |
| 1,500,510 A | * | 7/1924 | McElvar et al. | 224/259 |
| 2,431,780 A | | 12/1947 | Theal | |
| 2,651,441 A | * | 9/1953 | Rau et al. | 224/259 |
| 3,120,403 A | * | 2/1964 | Molzan et al. | 294/74 |
| 3,258,788 A | * | 7/1966 | Anciaux | 224/259 |
| D267,598 S | * | 1/1983 | Lyer et al. | D3/32 |
| 4,406,348 A | * | 9/1983 | Switlik, II | 182/3 |
| 4,887,752 A | * | 12/1989 | Nauta | 224/202 |
| 5,009,349 A | | 4/1991 | Eide et al. | |
| 5,307,967 A | * | 5/1994 | Seals | 224/257 |
| 5,466,040 A | * | 11/1995 | Rainsztein | 297/183.6 |
| 5,503,448 A | | 4/1996 | Dewey | |
| 5,588,940 A | | 12/1996 | Price et al. | |
| 5,927,781 A | | 7/1999 | Lyons, Jr. | |
| 6,039,376 A | | 3/2000 | Lopreiato | |
| 6,446,849 B1 | * | 9/2002 | Schleifer | 224/258 |
| 6,508,389 B1 | * | 1/2003 | Ripoyla et al. | 224/157 |

FOREIGN PATENT DOCUMENTS

| | | |
|---|---|---|
| EP | 096839 A2 * | 5/1994 |
| GB | 2224193 A | 2/1990 |
| JP | 3-205204 | 9/1991 |

* cited by examiner

*Primary Examiner*—Sue A. Weaver
(74) *Attorney, Agent, or Firm*—Margaret Polson; Patent Law Offices of Rick Martin, P.C.

(57) ABSTRACT

A shoulder harness is made of straps forming a figure eight having a criss-cross strap configuration across a worker's back. Two adjustable sized loops are formed which hang under the worker's arms. A hook is threaded into each loop. A wide tension buckle is mounted from the hooks via carabiners, thereby centering the tension buckle in front of the worker. A web lift strap about six inches wide is threaded into the tension buckle. A second worker threads the opposite end of the lift strap into his tension buckle. The lift strap is placed under a load and carried by the two workers over rough surfaces that dolly wheels couldn't handle. Alternate embodiments include a central ring to join three or more workers' straps together, a hip carry mode which joins the two loops at a hip, and a two-strap mode for carrying loose objects.

11 Claims, 6 Drawing Sheets

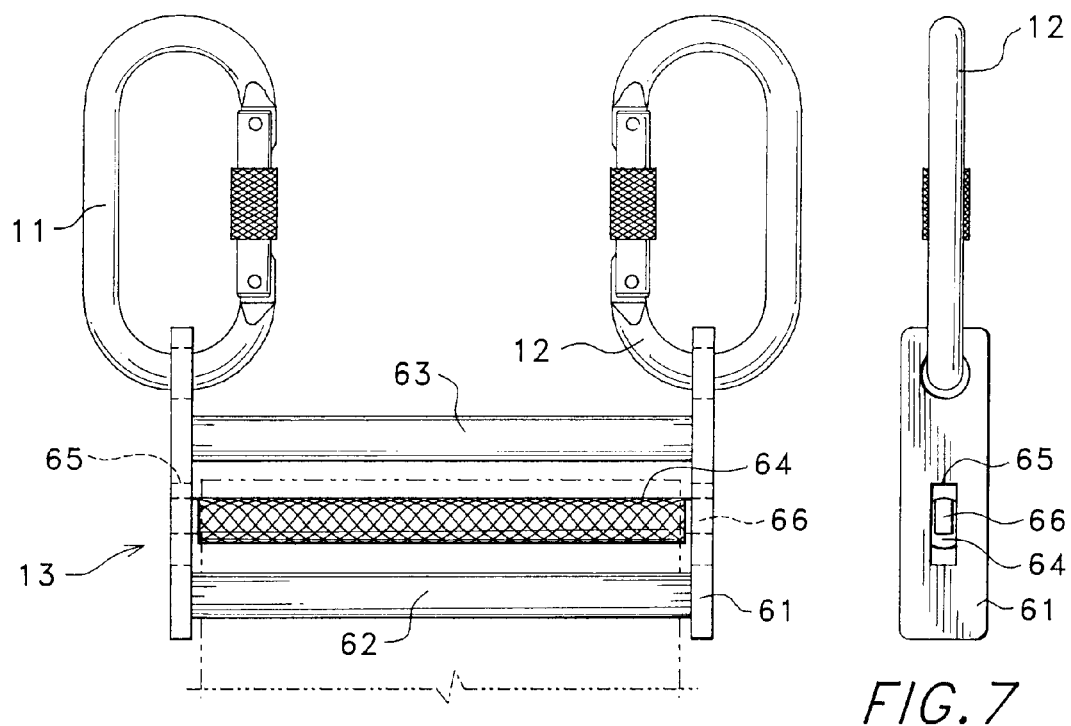
FIG. 6
FIG. 7
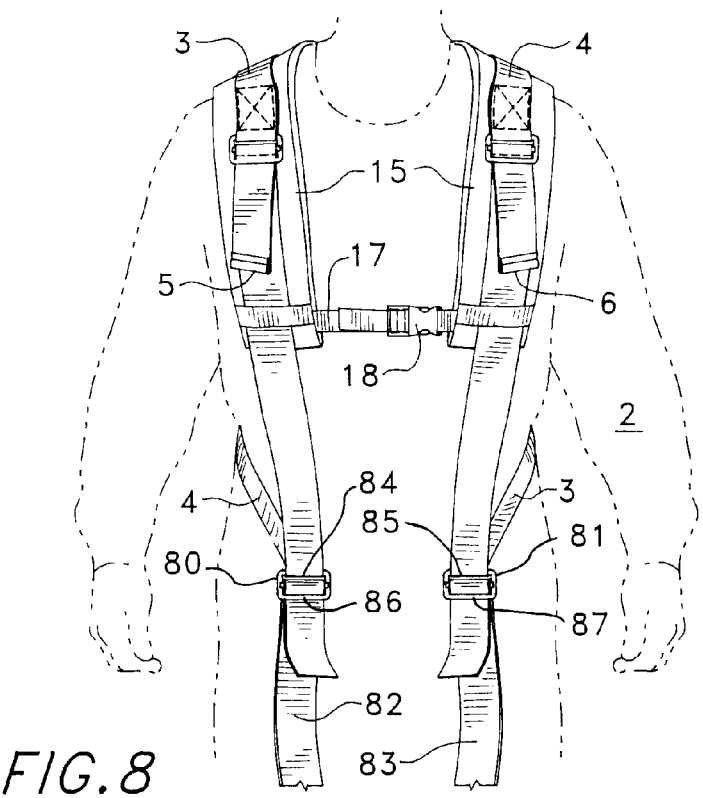
FIG. 8

LIFTING HARNESS

CROSS REFERENCE APPLICATIONS

This application is a non-provisional application claiming the benefits of provisional application Ser. No. 60/283,974 filed Apr. 17, 2001.

FIELD OF INVENTION

The present invention relates to a shoulder harness and lifting strap apparatus suited to allow two or more workers to lift large, heavy appliances and the like and/or to enable a single worker to lift a large mattress and the like.

BACKGROUND OF THE INVENTION

Inventions which enable two men to more easily lift and carry heavy objects such as refrigerators, stoves, washer/dryers, large loaded crates and the like, are known in the art. Common construction being such that the weight is suspended from the workers' shoulders, leaving their arms and hands free to steady the load. A strap or straps is suspended between each worker's shoulder harness, wherein the strap carries the load.

U.S. Pat. No. 2,431,780 (1947) to Theal discloses a two-person lifting apparatus having a shoulder harness for each worker. Each shoulder harness pins the worker's arms against his ribs while the load is carried by a strap assembly which is suspended between them. The pinning of the worker's arms reduces the efficiency of the worker and increases the risk of accidents.

U.S. Pat. No. 5,009,349 (1991) to Eide et al. discloses an improved shoulder harness for supporting a pair of straps that carry a load. The harness permits free arm movement. The two straps required each have metal hoops at each end. The hoops hook onto hooks which are suspended from the shoulder harness. The hoops prevent the sliding of the strap under an appliance. The system requires access from each side of the appliance to place the straps under the appliance from the side.

The present invention requires only one strap which can be easily slid under an appliance from front to back or side to side. A relatively wide tension buckle is suspended from each worker via a pair of carabiners. Each tension buckle supports an end of a relatively wide, flat, web type strap. That strap can support any load that several workers could lift. Several works can connect their strap to a central ring for lifting heavy loads. The harness allows full arm movement and provides an "X" pattern across the worker's back to evenly distribute the load and prevent a strap from slipping off a shoulder.

SUMMARY OF THE INVENTION

An aspect of the present invention is to provide a two-worker shoulder harness-based lifting apparatus that supports a single strap between the workers.

Another aspect of the present invention is to provide a tension adjustment buckle for each shoulder harness to enable the worker to cinch up his strap end as desired.

Another aspect of the present invention is to provide a three or more worker system having a central ring to combine the straps of each worker.

Another aspect of the present invention is to provide a one-worker configuration using a large loop-type strap to carry a mattress or the like against either hip.

Other aspects of this invention will appear from the following description and appended claims, reference being made to the accompanying drawings forming a part of this specification wherein like reference characters designate corresponding parts in the several views.

The present invention uses an "X" style pattern of straps across the worker's back. The top and bottom ends of each side of the "X" form a loop in front which carries a support buckle. Each left and right support buckle carries a carabiner. Between the carabiners is a wide (about six-inch) tension buckle which adjustably supports a wide webbed strap end. The harness has a cross-chest adjustment strap to snug the shoulder straps inward.

In operation, the single flat strap is placed under the load. Each worker adjusts a single tension buckle in preparation to lift. During the lift and carry process, each worker's arms are free to steady the load.

BRIEF DESCRIPTION OF THE DRAWINGS

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

FIG. 6 is a front plan view of the tension buckle and carabiners.

FIG. 7 is a side plan view of the tension buckle and carabiners.

FIG. 8 is a front plan view of an alternate embodiment harness using two smaller tension buckles and two straps.

FIG. 12 is the same view as FIG. 10 showing another strap embodiment for a hip-type carry of a mattress and the like.

DETAILED DESCRIPTION OF THE DRAWINGS

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

Figure 1:
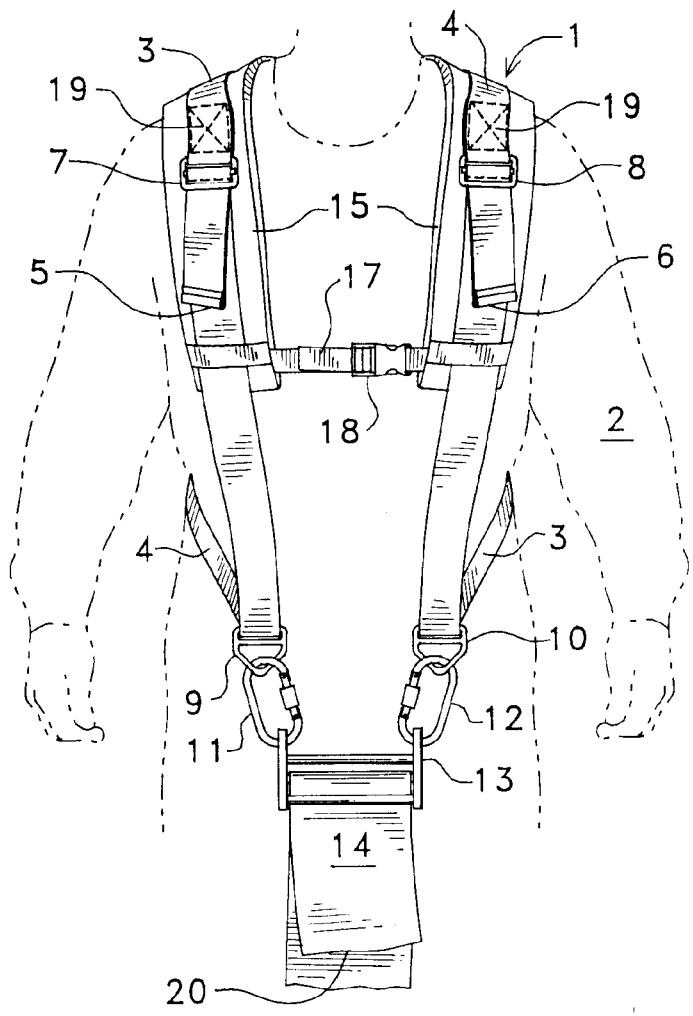
FIG. 1 is a front plan view of the preferred embodiment worn by a worker shown in dots.
Figure 2:
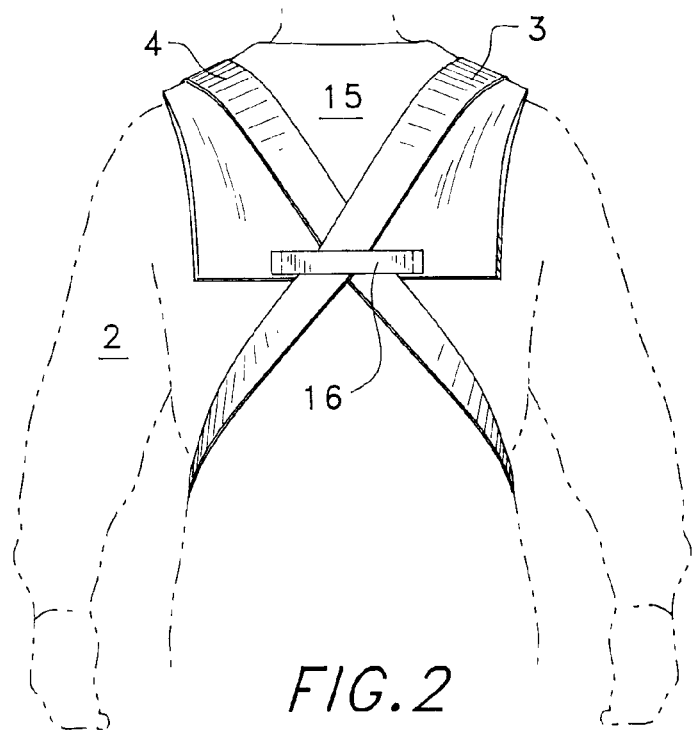
FIG. 2 is a back plan view of the FIG. 1 embodiment.

Referring to FIGS. 1, 2, the preferred embodiment lift harness 1 is shown. A figure 8 continuous strap forms a left shoulder loop 4 and a right shoulder loop 3. The end 5 can be pulled through buckle 7 to adjust loop 3. The end 6 can be pulled through buckle 8 to adjust loop 4. The loops 3, 4 are held to pad 15 with stitches 19. A chest strap 17 has buckle 18 for size adjustment. A safety strap 16 prevents travel of the rear portions of the loops 3, 4.

All loads are shared by loops 3, 4 via hooks 9, 10 which hang down in front of the worker 2. Carabiners 11, 12 are clipped into the hooks 9, 10. A tension buckle 13 is about six inches wide and is also clipped into the carabiners 11, 12. A lift strap 14 is about six inches wide and of a webbed construction. The end 20 threads through the tension buckle 13 in a known manner to allow the worker 2 to cinch up the lift strap 14 under the load (not shown) after the lift strap 14 is set under the load.

Figure 3:
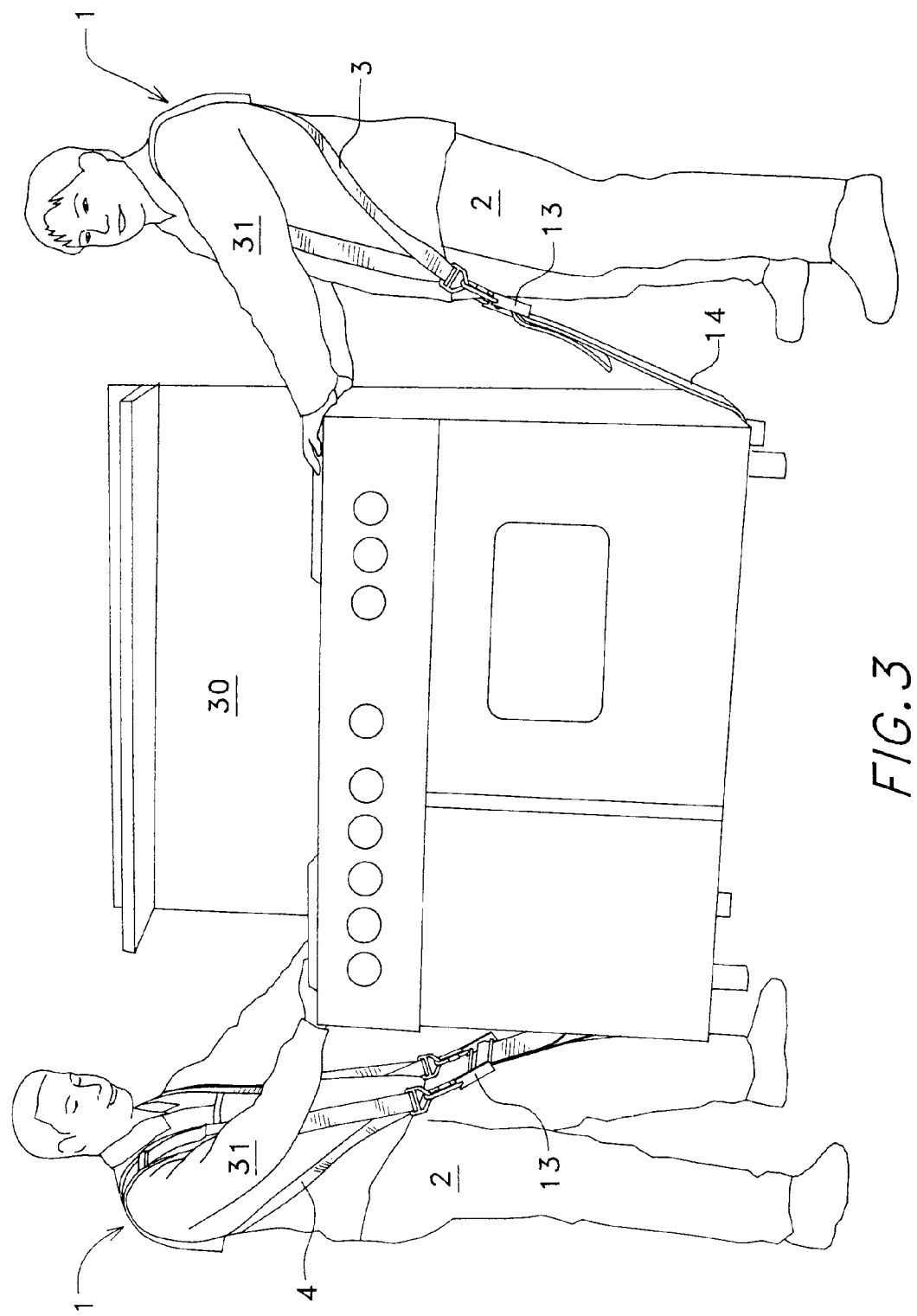
FIG. 3 is a front perspective view of two workers lifting a stove with the FIG. 1 embodiment.

Referring next to FIG. 3, two workers 2 each have an identical lift harness 1 mounted on their shoulders. The workers' arms 31 are totally free to steady the load, stove 30. The stove 30 can be delivered across a pebble surface, cracked pavement or a wet surface without damage and over surfaces where wheels on a dolly or hand truck would not function.

Figure 4:
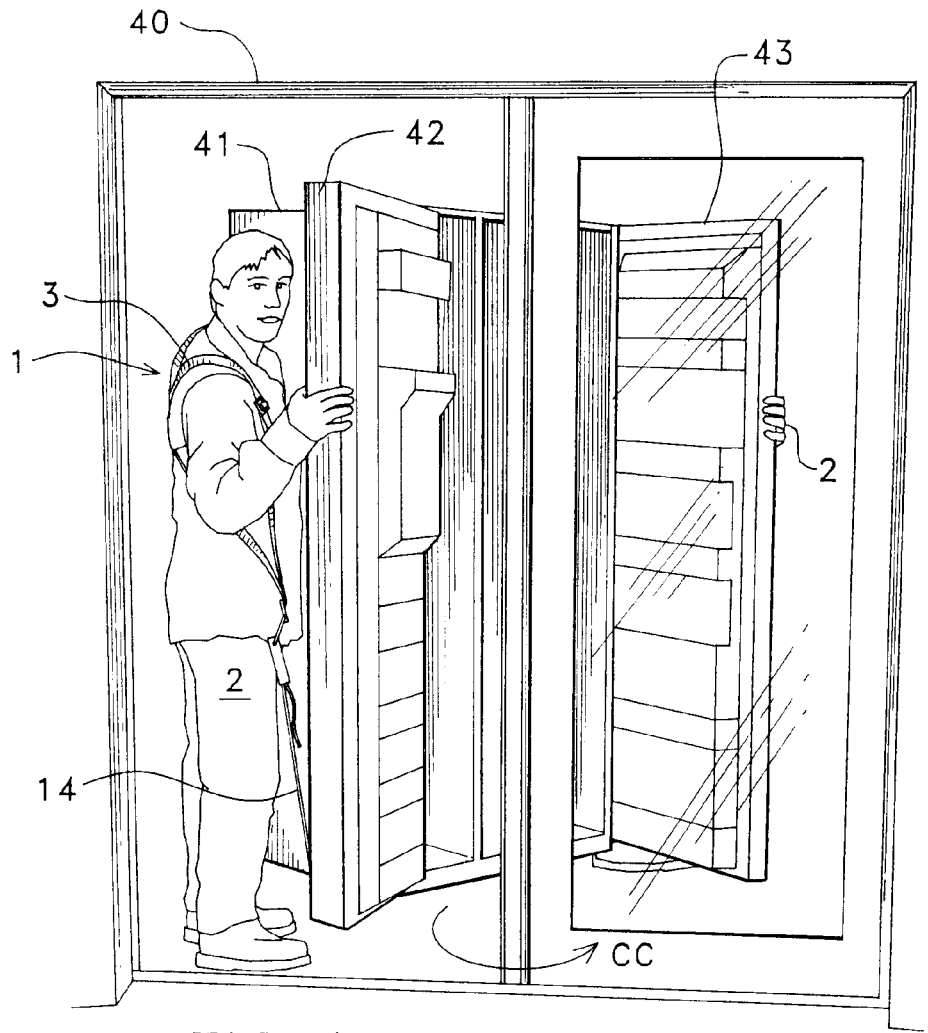
FIG. 4 is a front perspective view of two workers moving a wide refrigerator through narrow doorway by opening the refrigerator door and rotating the refrigerator.

Referring next to FIG. 4, the worker 2 is wearing his harness 1. A double door refrigerator freezer 41 is too wide to fit through doorway 40. With the harness 1 on each worker 2 (the second worker's fingers are showing), the doors 42, 43 are opened, and the refrigerator freezer 41 is lifted by lift strap 14 as shown. Next the refrigerator freezer 41 is rotated counter clockwise as shown by arrow cc and carried through the doorway 40. This is an improved method for passing a wide unit through a narrow doorway as compared to using hand truck or dolly.

Figure 5:
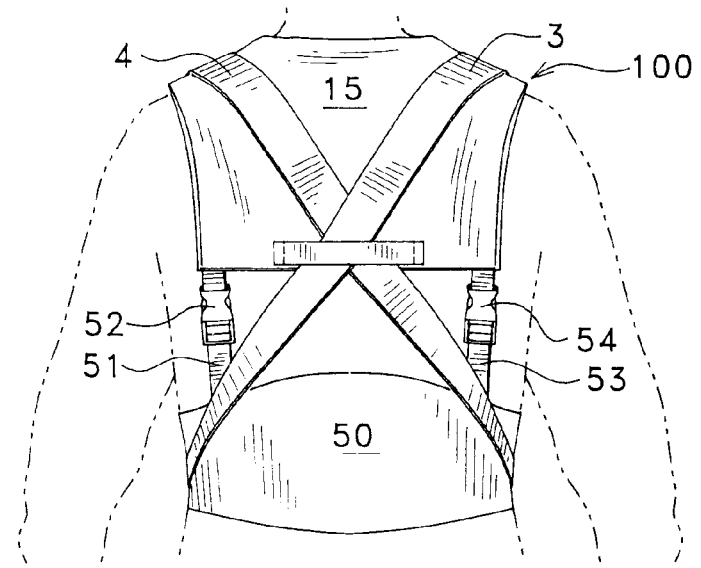
FIG. 5 is a back plan view of an alternate embodiment having a back support belt working in combination with the shoulder harness.

Referring next to FIG. 5, an alternate embodiment lift harness 100 is the same as lift harness 1 with the addition of a back support 50. Back support 50 is attached to the pad 15 via straps 51, 53 and buckles 52, 54. The front of the back support (not shown) could have straps also. The back support 50 is known in the art and has a hook and loop and/or buckle fastener in the front.

Referring next to FIGS. 6, 7, the tension buckle 13 is about six inches wide to handle the lift strap 14. The standard carabiners 11, 12 clip into top holes on the side panels 60, 61 as shown. There is an upper fixed roller 63 and a lower fixed roller 62. A central roller 64 is knurled and slides up and down in slot 65 via an end piece 66, thereby locking the lift strap 14 under a load. The single wide lift strap provides exceptional stability when placed directly under large objects as shown in FIGS. 3, 4. The tension buckle 13 was custom made for this invention.

Referring next to FIG. 8, an alternate embodiment dual lift strap harness is shown. The upper harness with loops 3, 4 is the same as the preferred embodiment. A pair of buckles 80, 81 each have a top rung 84, 85 through which the loops 3, 4 pass. A central and lower rung combination 86, 87 supports a lift strap pair 82, 83 which could be useful for lifting lumber or other objects.

Figure 9:
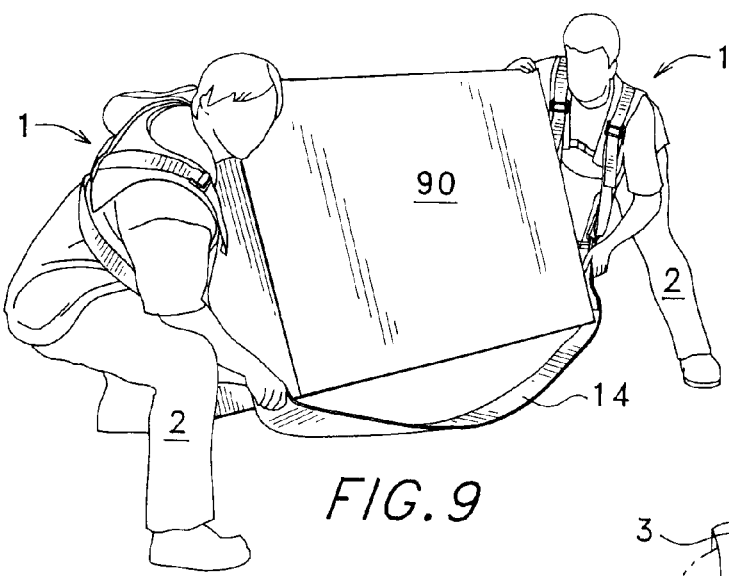
FIG. 9 is a front perspective view of a crate being lifted to place the strap of the preferred embodiment under it for carrying.

Referring next to FIG. 9, a preferred embodiment harness 1 is worn by each worker 2. The carton 90 is tilted to place the lift strap 14 beneath it. The lift strap 14 is thin enough to slide under many objects such as appliances.

Figure 10:
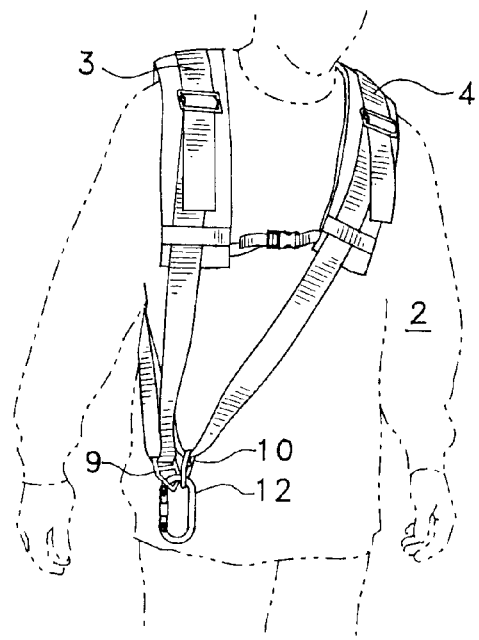
FIG. 10 is a front perspective view of an alternate arrangement of the shoulder harness of FIG. 1, wherein a carabiner joins the left and right front support buckles for a hip style carrying project.
Figure 11:
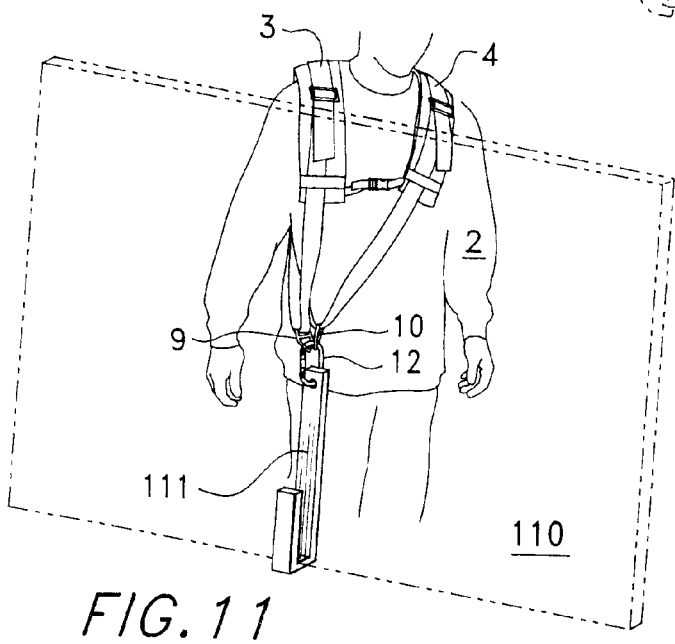
FIG. 11 is the same view as FIG. 10 showing a sheetrock panel being carried by an L-shaped bracket supported by the carabiner which is mounted by the worker's hip.
Figure 12:
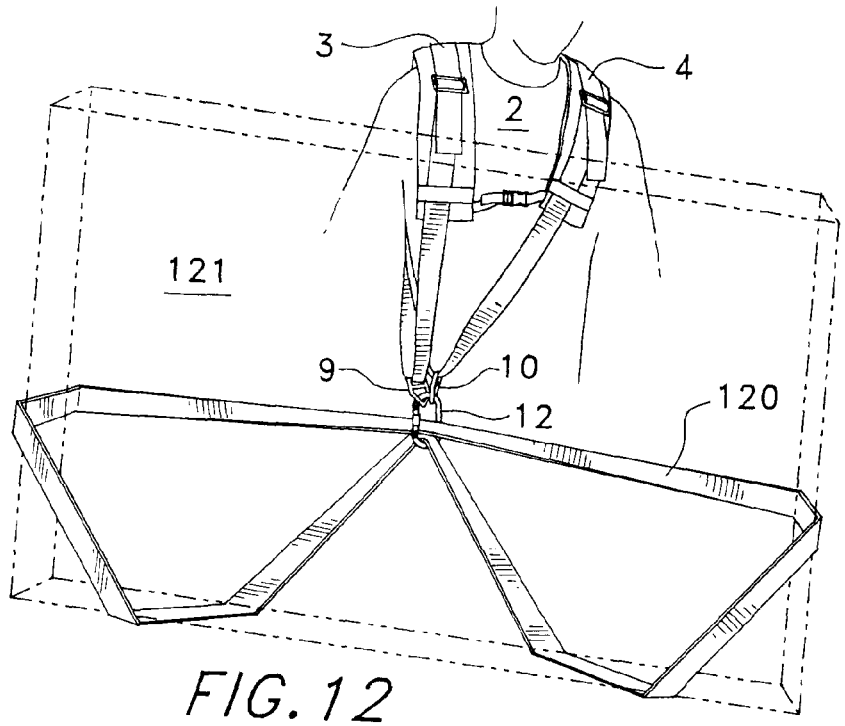

FIGS. 10, 11, 12 show an alternate embodiment configuration of the harness 1 which deletes the tension buckle 13. Loop 4 has been drawn to the worker's right side. Hooks 9, 10 have been coupled by carabiner 12.

FIG. 11 shows an L-shaped hook 111 supporting a board 110 from the right hip of the worker. FIG. 12 shows a mattress 121 being supported by a strap(s) 120 which in turn is supported by the carabiner 12 in hooks 9, 10. A strap apparatus as described in U.S. Pat. No. 5,927,781 (1999) to Lyons, Jr. (incorporated herein by reference) could also be used to carry large objects with this harness embodiment.

Figure 13:
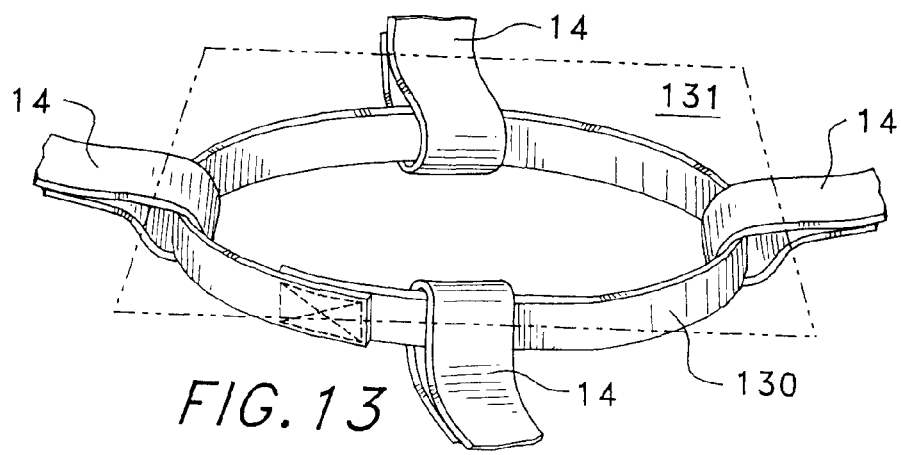
FIG. 13 is a top perspective view of an alternate embodiment central ring for enabling three or more workers to combine their straps under a heavy load.

Referring next to FIG. 13, four workers (not shown) each have a lift strap 14. A central ring 130 joins all four straps 14. The central ring 130 is placed under a heavy load 131 to share the lifting among the four workers.

Figure 14:
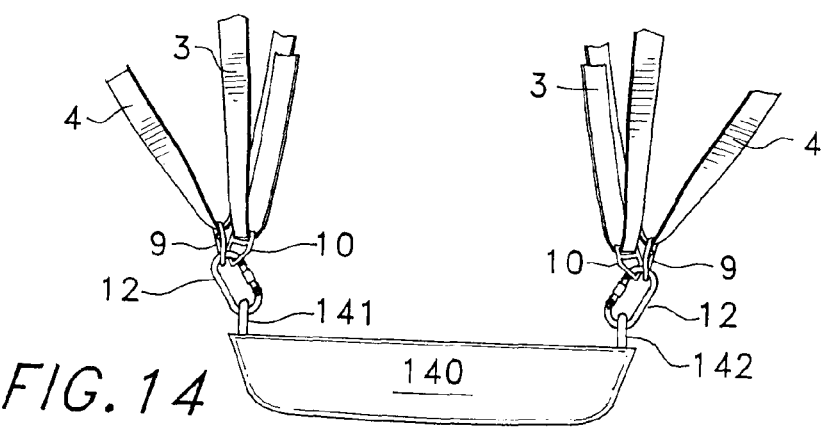
FIG. 14 is a side plan view of a stretcher being carried by two workers, each wearing the configuration of the harness shown in FIG. 10.

Referring next to FIG. 14, a stretcher 140 is carried by two workers (not shown), each wearing the hip carry embodiment of FIG. 10. Each worker's hands are free to stabilize the stretcher as well as render first aid if needed. The carabiners 12 snap into eye bolts 141, 142.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A lifting harness comprising:
   a continuous strap configured into a figure eight to form a left and a right support loop around a user's torso;
   said continuous strap having a first and a second end, each end threaded through a buckle, thereby enabling an adjustment of each loop's size;
   a hook connected to each loop; and
   a tension buckle and central lift strap mounted between the hooks, thereby enabling the central lift strap to be connected to a second user to use the central lift strap to lift and carry objects.

2. The apparatus of claim 1 further comprising a pad sewn under the continuous strap, the pad shaped to cover the user's shoulders, upper back and left and right chest segments, said left and right chest segments joined by a strap and adjustment buckle.

3. The apparatus of claim 2 further comprising a left and a right carabiner connecting the hook to the tension buckle.

4. The apparatus of claim 3, wherein the central lift strap has a width in excess of four inches.

5. The apparatus of claim 1 further comprising a left and a right carabiner connecting the hook to the tension buckle.

6. The apparatus of claim 1 further comprising three or more lifting harnesses each having a central lift strap attached to a common lift ring, thereby enabling several users to lift an object via the lift ring.

7. A lifting harness comprising:
   a left and a right strap loop each depending from a shoulder harness for a human worker;
   a hook attached to each loop;
   a central tension buckle supported between the hooks; and
   a load strap threaded from the central tension buckle and connected to a second human worker's central tension buckle, thereby enabling the two workers to lift and carry a load.

8. The apparatus of claim 7 further comprising a carabiner connecting the central tension buckle to the hook.

9. A lifting harness comprising:
   a continuous strap configured into a figure eight to form a left and a right support loop around a user's torso;

a hook connected to each loop;
a first mode of configuration having a clip connecting the hooks together for a hip carry operation;
a second mode of configuration having a left and a right clip support a central tension buckle having a lift strap; and
a third mode of configuration having said hooks each support a lift strap.

10. The apparatus of claim 9, wherein the first mode of configuration further comprises said clip supporting an L-shaped hook.

11. The apparatus of claim 9, wherein the first mode of configuration further comprises said clip supporting a strap (s) configured to carry a large flat object.

* * * * *